F. PHELPS.
RELEASE VALVE.
APPLICATION FILED AUG. 19, 1910.

1,087,399. Patented Feb. 17, 1914.

Witnesses
Donald H. Stewart
Joseph C. Stack

Inventor
Frank Phelps
By Howell Howell
his Attorneys.

UNITED STATES PATENT OFFICE.

FRANK PHELPS, OF LITTLE ROCK, ARKANSAS.

RELEASE-VALVE.

1,087,399.   Specification of Letters Patent.   Patented Feb. 17, 1914.

Application filed August 19, 1910. Serial No. 577,946.

*To all whom it may concern:*

Be it known that I, FRANK PHELPS, a citizen of the United States, residing at Little Rock, in the county of Pulaski and State of Arkansas, have invented certain new and useful Improvements in Release-Valves, of which the following is a specification.

The object of the present invention is to provide a release valve for use in connection with hydraulic presses and other fluid-pressure apparatus, where large volumes of water have to be handled quickly and work under high pressure. The said release valve is intended more particularly to take the place of the stop-cock located in the outlet pipe from the fluid-pressure chamber of a hydraulic motor, or in the pipe line connecting the fluid-pressure supply pipe with the fluid supply tank into which the liquid is exhausted by the return movement of the ram. In hydraulic motors for cotton compresses, and other heavy work, the said stop-cock is subjected to high working pressure, and in the operation thereof serious difficulties are encountered, first, because the fluid leaks around and from the casing of the plug, and, second, because the high pressure acting upon one side of the plug when closed renders it often very difficult to open the stop-cock as quickly as desired, besides which the repeated operations of the stop-cock when subjected to such high pressure cause considerable wear and impair the performance of its functions. Moveover, in hydraulic presses for heavy work, where a large volume of water has to be handled in as short a time as possible, the use of a stop-cock is somewhat impracticable, not only because a very large stop-cock is required, but also because of the time consumed in turning a stop-cock of the required dimensions to off or on positions and vice versa.

My present invention obviates the difficulties above mentioned by providing a valve for controlling the motive fluid which is operated by the fluid pressure, and normally held closed thereby, but adapted to be quickly released and opened through the agency of the fluid-pressure controlled by an auxiliary cock or valve.

Figure 1:
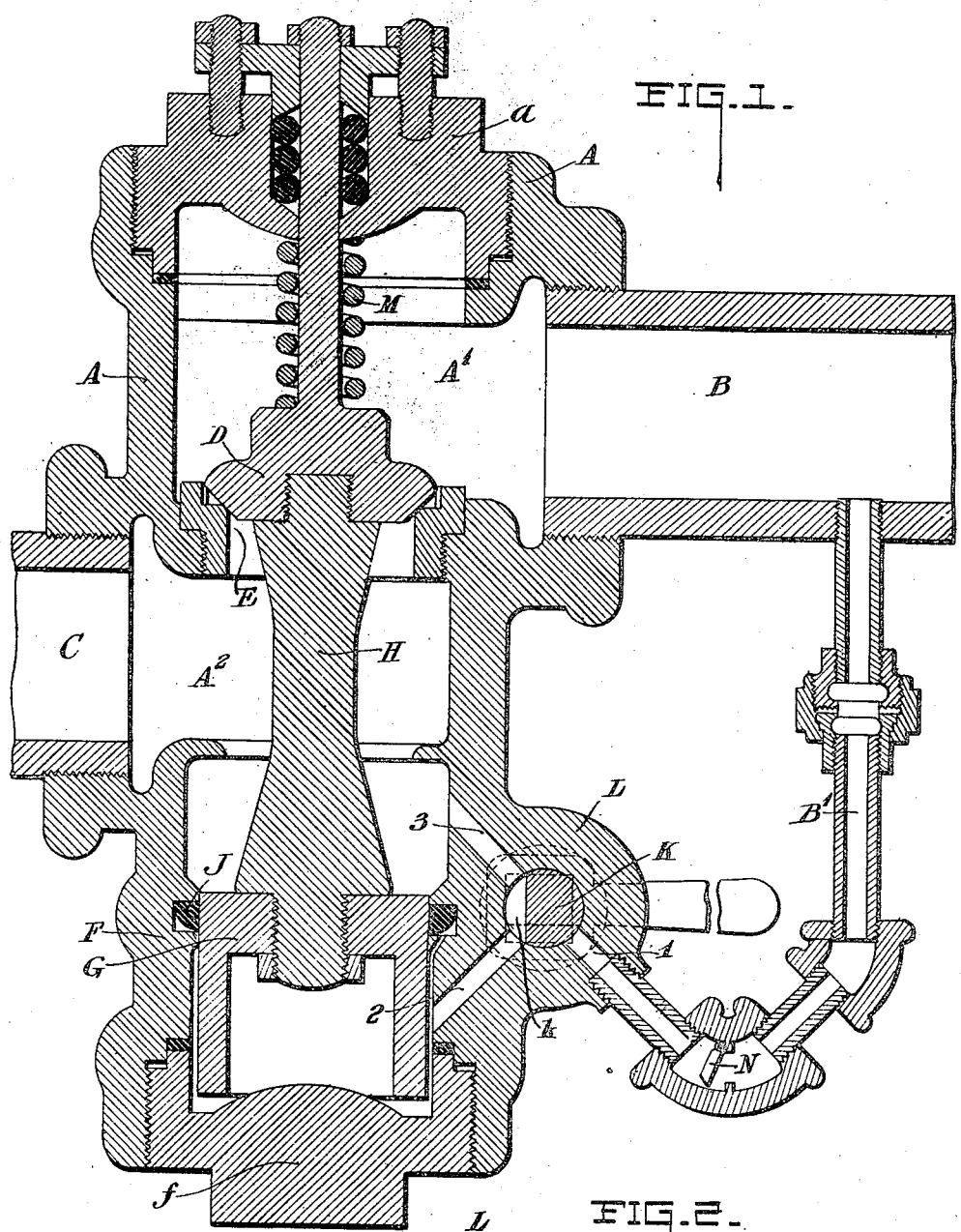
Figure 2:
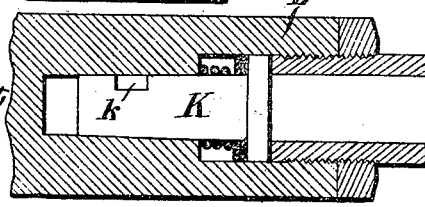

In the accompanying drawings which form a part of this specification: Figure 1 is a sectional view of a release valve embodying my invention; Fig. 2 is a detail sectional view of the auxiliary cock.

The illustrated structure will be hereinafter described, and the invention will be particularly pointed out in the claim appended to this specification.

In the drawings, A is a valve-casing having inlet and outlet openings connected respectively with a fluid-pressure pipe B and the outlet or exhaust pipe C. The fluid pressure pipe B is or may be in communication with the pressure chamber or cylinder of a hydraulic motor, or may be a branch pipe of the fluid-pressure supply pipe (not shown) leading from the force pump to the cylinder or ram; and in such fluid-pressure supply pipe there would usually be placed a check valve between the pump and branch pipe B, said check valve opening in the direction of flow of the liquid from the pump, as and for the purpose which will be understood by those familiar with the art to which my invention appertains. The outlet or exhaust pipe C may lead back to the supply tank (not shown) from which the fluid is forced by the pump to the cylinder of the ram; so that the release valve herein described may, for exemplification, be considered as arranged in the outlet pipe line between the fluid-pressure supply pipe and the supply tank for a hydraulic motor.

In the valve case A is a puppet valve D, the stem of which works in a stuffing box or packing gland provided preferably on a removable cap or bonnet $a$. Said valve is seated upon the pressure side of and closes the opening in a valve-seat E, which valve-seat is arranged between the inlet and outlet openings aforesaid and divides the valve-case internally into a pressure chamber $A^1$ and exhaust chamber $A^2$. The valve-seat E is preferably made as a detachable seat ring. Below its exhaust chamber and outlet opening, the valve-case is extended to provide a cylinder F, the end of which is preferably closed by a detachable cap or bonnet $f$. In said cylinder is a piston G, which is rigidly connected with the valve D by a stem or arbor H. Said piston has a larger cross-sectional area than the valve. In the form shown, it is a cup-like piston of less diameter than the bore of the cylinder, and works in an annular packing or packing ring J provided in the cylinder to make a fluid-tight closure around the piston. In the wall of the cylinder is a 3-way cock K, the case of which is indicated at L. The turn plug therein has a port $k$ which may be a laterally transverse slot, adapted to establish communication between the passages or ports 1 and 2, or the passages 2 and 3. The passage 1 is in communication with the fluid-pressure pipe B, through a branch pipe $B^1$; the passages 2 and 3 are respectively in communication with the spaces or chambers in the cylinder F below and above the piston G, or below and above the packing ring J in the structure illustrated. The pipe $B^1$ and passages 1 and 2 constitute a by-pass adapted to transfer part of the pressure fluid to the cylinder for unseating the valve, and the passage 3 constitutes an auxiliary by-pass which intersects the first mentioned by-pass and is adapted to coöperate with part of the same, namely the passage 2, to permit exhaust from the cylinder through the exhaust chamber $A^2$. The cock K, being arranged at the intersection of said by-passes, constitutes a common controlling device for both of them.

The operation is as follows: The turn plug K being in the position shown, shutting off communication from the branch pipe $B^1$, the fluid-pressure in B maintains the valve D seated and closed; so that the fluid under pressure in the fluid-pressure supply pipe with which the pipe B is connected is delivered to the cylinder of the hydraulic motor to operate the ram or piston therein. When it is desired to withdraw or exhaust the fluid from the motor to return the ram to starting position, the valve D is released by turning the plug K so that its port $k$ connects the passages 1 and 2 as indicated by dotted lines. This admits fluid-pressure from B through $B^1$ into the cylinder F below the piston G, and as said piston has a greater area than the valve D, it will lift said valve, establishing communication between $A^1$ and $A^2$, allowing the fluid to be withdrawn or flow off through the outlet pipe C. To return the valve to its seat, for the purpose of again directing the fluid-pressure to the hydraulic motor, the turn plug K is turned back to the position shown in full lines, connecting the passages 2 and 3, and shutting off the passage $B^1$. Fluid-pressure being thus cut off from the piston G, the valve D reseats itself under the fluid-pressure in B, and the fluid under the piston in the cylinder F passes off through the passages 2 and 3 into $A^2$ and out at C.

I am aware that my invention may be made in other structural forms, than that herein shown and described, and hence do not desire to limit myself to any particular construction. The release valve may also be used for other purposes, as, for example, to reduce or relieve the pressure in a pipe line or in any fluid pressure container. A spring M may be used to seat the valve D, in which case a check valve N is placed in the branch pipe $B^1$ and opens toward the cylinder F. When the piston G is raised the fluid becomes trapped in the cylinder, hence the spring cannot close the valve until the fluid is released through the passages 2 and 3.

I claim as my invention and desire to secure by Letters Patent:

A release valve for fluid-pressure pipes comprising a valve case having pressure and exhaust chambers and an intermediate valve-seat, and having a cylinder extending from said exhaust-chamber, a valve seated on the pressure side of said valve-seat and adapted to be held thereto by the fluid pressure, a spring acting on the valve and tending to hold it seated, a piston in said cylinder of larger area than the valve and connected thereto, a three-way cock, one of the passages of which is in communication with the fluid-pressure pipe and the two other passages of which are respectively in communication with the cylinder on opposite sides of the piston, and a check valve in the first-mentioned passage opening toward the cylinder.

In testimony whereof I affix my signature, in presence of two witnesses.

FRANK PHELPS.

Witnesses:
 T. F. HUTCHINSON,
 ED PRATHER.